United States Patent Office 3,520,936
Patented July 21, 1970

---

3,520,936
CONDENSATION OF CARBONYL COMPOUNDS IN PRESENCE OF AN ORGANIC HETEROCYCLIC COMPOUND HAVING AT LEAST ONE SIX-MEMBERED RING CONTAINING THREE CONJUGATED DOUBLE BONDS AND CONTAINING BORON AS A HETERO ATOM
Robert D. Offenhauer, Pennington, N.J., assignor to Mobil Oil Corporation, a corporation of New York
No Drawing. Filed Dec. 14, 1966, Ser. No. 601,807
Int. Cl. C07c 45/00
U.S. Cl. 260—601                                        1 Claim This invention relates to the condensation of carbonyl group-containing compounds in the presence of a catalyst comprising a boron-containing heteroaromatic compound having a hydroxy group attached to the boron atom. It is characterized by the substantially quantitative conversions obtainable.

Essentially the invention comprises reacting a carbonyl group-containing compound with itself or with another carbonyl group-containing compound in the presence of the boron-containing heteroaromatic. The boron atom, and also either an oxygen or a nitrogen atom or both, are present in a six-membered ring of the heteroaromatic as hetero atoms, and as described, a hydroxy group is attached to the boron.

The useful boron compounds may have one or more six-membered rings. Generally there are two or more such rings, which are condensed together, one of which usually contains the hetero atoms and the other or others of which are usually purely aromatic and may or may not contain other substituents. However, some of the compounds may have two heteroaromatic rings.

One of the simplest compounds has the structure

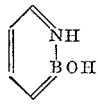

(1) 2-hydroxy-2,1-borazarobenzene Other illustrative compounds are the following:

(2) hydroxy-2,1-borazaronaphthalene
(3) 2 - (3 - (1-hydroxy-1,2-boroxaronaphthyl))benzene boronic acid
(4) 10-hydroxy-10,9-borazaroanthracene
(5) 10-hydroxy-10,9-borazarophenanthrene
(6) 10-hydroxy-10,9-boroxarophenanthrene
(7) 2,6,8 - tribromo - 10 - hydroxy-10,9-boroxarophenanthrene
(8) 6,8-dibromo-10-hydroxy-10,9-boroxarophenanthrene
(9) 9-ethyl-10-hydroxy-10,9-borazarophenanthrene
(10) 6,8 - dichloro - 10 - hydroxy - 10,9 - borazarophenanthrene
(11) 2,6,8 - trichloro - 10-hydroxy-10,9-borazarophenanthrene
(12) 8-nitro-10-hydroxy-10,9-borazarophenanthrene
(13) 6-nitro-10-hydroxy-10,9-borazarophenanthrene
(14) 6-amino-10-hydroxy-10,9-borazarophenanthrene
(15) 8-amino-10-hydroxy-10,9-borazarophenanthrene
(16) 6,8-diacetyl-10-hydroxy-10,9-borazarophenanthrene
(17) 6-acetyl-10-hydroxy-10,9-borazarophenanthrene
(18) 6-hydroxy-6,5-boroxarobenz(a)anthracene
(19) 5,12 - dihydroxy - 5,12 - dibora - 6,13 - dioxarodibenz(a,h)-anthracene
(20) 4-hydroxy-4,3-boroxaroisoquinoline
(21) 2-acetamidobenzene-1,4-diboronic acid monoanhydride
(22) 2-ureidobenzene-1,4-diboronic acid monoanhydride
(23) 2-acetamidobenzeneboronic acid anhydride
(24) 2-benzoylaminophenylboric acid semianhydride.

The preparation of several of the foregoing compounds may be indicated briefly for illustrative purposes. Thus, No. 6 is formed by treatment of No. 5 with nitrous acid followed by adding the resulting material to hot water to give No. 6. See Dewar et al., Tetrahedron Letters, No. 14–21 (1959); Dewar et al., J. Chem. Soc., 1344 (1960); Dewar et al., J. Chem. Soc., 2201 (1963). No. 20 is made by treatment of o—(CHO)C₆H₄(B(OH)₂) with 85% hydroxylamine; see Snyder et al., J.A.C.S. 80–835 (1958). Preparation of Nos. 3 and 6 are described in the first two citations. No. 4 is described in Davidson et al., J. Chem. Soc., 191 (1960).

Most of the foregoing compounds are solids at ambient temperatures. Many exhibit physical properties, such as appearance, odor, melting point, solubility, etc., which are similar to those of the hydrocarbon which they structurally resemble. Chemically, they are usually stable against oxidation by air. In several respects they have an aromatic character. For use as catalysts in the invention, they are employed in small amounts as is customary with catalysts in general. Preferably they are dissolved in an inert solvent, which may be chosen from those known to dissolve the corresponding hydrocarbon; preferably, too, a solvent is chosen which will also dissolve the reactants. For example, suitable solvents include aromatics like benzene, toluene, the xylenes, ethylbenzene, dibutyl ether, nitrobenzene, etc.

The carbonyl-containing compound is preferably an aldehyde or a ketone. Either may be reacted with itself, or with a compound of the same homologous series, or with a compound of the other homologous series. The reaction of an aldehyde with itself is, of course, the familiar aldol condensation, one aldehyde molecule supplying the carbonyl group and the other an alpha hydrogen, the product being a beta-hydroxy aldehyde, sometimes termed an "aldol"; if the latter contains an alpha hydrogen, as according to the invention is the case, it readily loses water to form an alpha, beta unsaturated aldehyde. The reaction may be illustrated as follows:

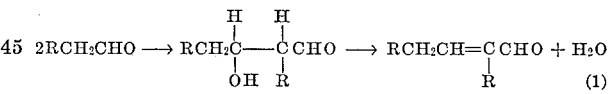

where R may be alkyl or hydrogen. The aldol product loses water and is converted to the unsaturated aldehyde in the same reaction mixture. Ketones also exhibit the aldol condensation, reacting with themselves to give a hydroxy ketone which, if it contains an alpha hydrogen, as according to the invention is the case, can lose water to form an unsaturated ketone. The reaction may be illustrated as follows:

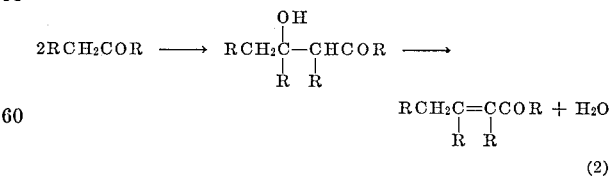

where R may be alkyl or hydrogen. An aldehyde may also react with a ketone, giving a hydroxy ketone which, if it has alpha hydrogen, as is the case, may lose water to form an unsaturated ketone. Thus, the reaction may be written as follows:

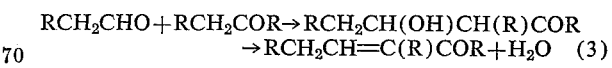

The preferred reaction is that of an aldehyde with itself, or of a ketone with itself. In either case, the reactant should have 2 to 3 hydrogen atoms connected to the carbon next to the carbonyl group; and preferably the resulting aldol product has an alpha hydrogen, as described. The foregoing holds true when an aldehyde is reacted with another and different aldehyde, or when a ketone is reacted with another and different ketone. In reactions between an aldehyde and a ketone, at least one reactant should have 2 to 3 H atoms on the carbon next to the carbonyl; the other reactant may or may not contain these particular H atoms.

Suitable specific aldehydes include, preferably, straight or branched chain alkanals having 1 to 18 carbons, more broadly 1 to 22 carbons, and derived from primary or secondary alcohols. Preferred alkanals are those which are liquid at ambient temperatures and pressures, such as propanal, butanal, pentanal, 3-methylbutanal, heptanal, octanal, decanal, etc. The invention also contemplates aldehydes like methanal, ethanal, and also normally solid alkanals like dodecanal, tetradecanal, hexadecanal, octadecanal, etc. Also aromatic aldehydes like benzaldehyde, for reaction with a reactant having alpha H atoms; also aralkanals like omega-phenylbutanal, omega-phenylethanal, etc. The aldehyde may be unsaturated at positions remote from the carbonyl group.

Preferred ketones may have 3 to 20 or 30 or more carbons, and at least one of the carbons attached to the carbonyl group should have 2 to 3 H atoms. Normally liquid ketones are preferred, such as acetone, 2-butanone, 3-methyl-2-butanone, 2-pentanone, 3-pentanone, 2-hexanone, etc. Also useful are normally solid ketones like cholestanone, androsterone, estrone, etc. Also, aromatic ketones like acetophenone, desoxybenzoin, 1-isobutyronaphthone, etc.; and cycloalkanones like cyclohexanone; and ketones like 1-(2-furyl)-butanone. The ketone may have unsaturation at locations remote from the carbonyl group.

The condensations, which, aside from the use of the present catalysts, are conventional, may be carried out at conventional temperatures, pressures, concentrations, and times. Refluxing temperatures are preferred, as well as ambient pressures. Equimolar concentrations generally are used when the reactants are different. Reaction times extend from 0.5 to 10 to 50 hours or more. During refluxing, the aldol product loses water, as described, being converted to the unsaturated material, and this may be carried out by conventional procedures, as by distillation, crystallization, solvent extraction, etc. Suitably the water is allowed to distill out as the reaction proceeds, this step being useful when water is the lowest boiling component and does not form an azetrope with any other component. If desired, an inert sweep gas, such as nitrogen, methane, ethane, helium, and the like, may be employed during the reaction to help remove water.

Another preferred step comprises adding an azeotroping agent to the reaction mixture to form an azeotrope with the water which will distill out at a temperature lower than the boiling point of any other component. This step is of value in any case where it is desired to facilitate removal of water and/or to remove it completely; it is of particular value when one or more of the other components is of such volatility as to distill over in the absence of the azeotrope. Conventional azeotroping agents are useful, including hydrocarbons like benzene, toluene, xylene, naphtha, and agents like dibutyl ether.

Also serviceable is the use of a water trap, such as a Dean-Stark trap, which permits water leaving the reaction mixture to be condensed and removed from the system without interfering with the condensation and return of any other component, including solvents.

Another water removal step comprises adding to the reaction mixture a water-soluble solvent, or a water-soluble reactant like acetone, methyl ethyl ketone, diethyl ketone, acetaldehyde, etc., and distilling the resulting solution from the mixture, this solution containing the water formed in the reaction. Such solvent or reactant may be dried and reused.

Another method of removing water comprises adding to the reaction mixture, in stoichiometric amount, an anhydride of the heteroaromatic boron compound which is being used as the catalyst. Thus, if the catalyst is 10-hydroxy - 10,9 - boroxarophenanthrene, the anhydride would be bis(10,9-boroxaro-10-phenanthryl) ether.

It is desirable to add a solvent to the reaction mixture to maintain the reactants in good contact with each other and with the catalyst. Suitable solvents are aromatics hydrocarbons like benzene, toluene, the xylenes, ethylbenzene and the like. Compounds like benzene and toluene are specially suitable as they also function as azeotroping agents. Other solvents are ligroin, ether, chloroform, carbon tetrachloride, various chlorinated ethanes, etc.

A substantially quantitative conversion is obtainable, with yields of unsaturated product ranging from 90 to 100%, based on the carbonyl reactant. It will be understood that products like alpha, beta unsaturated aldehydes, unsaturated aldehydes, and unsaturated ketones are valuable in themselves, as for example, plasticizers, and for conversion to other compounds of value.

The invention may be illustrated by the following example.

EXAMPLE

N-heptanal was condensed with itself in the following way. A mixture of 3.8 g. of heptanal, 10 g. of m-xylene as solvent, and 0.5 g. of 10-hydroxy-10,9-boroxarophenanthrene was refluxed, using a Dean-Stark trap. After 12 hours, the heptanal was quantitatively converted to 2-pentyl-2-nonenal. This product was identified by showing it to have an infrared analysis identical to a material known to be 2-pentyl-2-nonenal.

It will be understood that the invention is capable of obvious variations without departing from its scope.

In the light of the foregoing description, the following is claimed.

I claim:

1. Method of reacting an alkanal with the same or different alkanal to form a condensation product and water, said alkanals containing from one to twenty-two carbon atoms and one of said alkanals having from 2 to 3 alpha hydrogen atoms connected to a carbon atom alpha to the carbonyl group, which comprises carrying out said reaction in the presence of a condensation catalyst comprising 10-hydroxy-10,9-boroxarophenanthrene, said condensation product being an unsaturated alkanal of higher molecular weight than either of said alkanal reactants.

References Cited

Letsinger, Chemical Abstracts, vol. 60; col. 10705, April 1964.

LEON ZITVER, Primary Examiner

R. H. LILES, Assistant Examiner

U.S. Cl. X.R.

252—432; 260—49, 60, 347.8, 586, 592, 593, 594, 599